United States Patent
Alves et al.

(10) Patent No.: US 7,976,033 B2
(45) Date of Patent: Jul. 12, 2011

(54) SHOPPING CART HAVING A SUPPORT FOR STACKED BASKETS

(75) Inventors: Manuel Alves, Tortosendo (PT); Pedro Cunha, Varberg (SE); Teresa Alves Pereira, Tortosendo (PT)

(73) Assignee: Joalpe Industria de Expositores, S.A., Tortosendo (PT)

( * ) Notice: Subject to any disclaimer, the term of this patent is extended or adjusted under 35 U.S.C. 154(b) by 393 days.

(21) Appl. No.: 11/719,279

(22) PCT Filed: Nov. 10, 2005

(86) PCT No.: PCT/EP2005/012211
§ 371 (c)(1),
(2), (4) Date: Jul. 1, 2008

(87) PCT Pub. No.: WO2006/053706
PCT Pub. Date: May 26, 2006

(65) Prior Publication Data
US 2009/0174161 A1    Jul. 9, 2009

(30) Foreign Application Priority Data
Nov. 17, 2004 (FR) ..................... 04 12190

(51) Int. Cl.
*B62B 1/12* (2006.01)
(52) U.S. Cl. ............... 280/47.35; 280/33.998; 280/79.3
(58) Field of Classification Search ............... 280/47.35, 280/79.3, 47.19, 47.26, 33.998
See application file for complete search history.

(56) References Cited

U.S. PATENT DOCUMENTS

| | | | | |
|---|---|---|---|---|
| 2,615,726 A * | 10/1952 | Brottman | ............ | 280/47.35 |
| 3,121,496 A * | 2/1964 | Brunette | ............ | 211/126.8 |
| 3,721,349 A * | 3/1973 | Jaffee et al. | ............ | 211/126.1 |
| 4,268,049 A * | 5/1981 | Salvador | ............ | 280/33.996 |
| 5,203,578 A * | 4/1993 | Davidson et al. | ............ | 280/33.991 |
| 5,464,104 A * | 11/1995 | McArthur | ............ | 211/133.3 |
| 5,595,395 A * | 1/1997 | Wilson | ............ | 280/47.26 |
| D396,923 S * | 8/1998 | Moore | ............ | D34/24 |
| D399,625 S * | 10/1998 | Murphy et al. | ............ | D34/21 |
| 5,865,449 A * | 2/1999 | Castaneda | ............ | 280/33.996 |
| 6,079,719 A * | 6/2000 | Tisbo et al. | ............ | 280/47.35 |
| 6,126,181 A * | 10/2000 | Ondrasik | ............ | 280/33.991 |
| 6,131,926 A * | 10/2000 | Harlan | ............ | 280/47.26 |
| 6,454,293 B1 * | 9/2002 | Anderson | ............ | 280/651 |
| 6,736,415 B1 * | 5/2004 | Lenihan | ............ | 280/47.19 |
| 6,932,363 B2 * | 8/2005 | D'Angelo | ............ | 280/33.991 |
| 6,962,353 B1 * | 11/2005 | Garcia | ............ | 280/47.19 |
| 7,168,715 B1 * | 1/2007 | Friedman | ............ | 280/47.35 |
| 7,416,194 B2 * | 8/2008 | Splain et al. | ............ | 280/33.991 |

(Continued)

*Primary Examiner* — Jeffrey J Restifo
(74) *Attorney, Agent, or Firm* — Egbert Law Offices PLLC

(57) ABSTRACT

The trolley or shopping cart can be used to transport goods. This trolley includes a support on which two baskets can be stacked on top of one another, a first lower basket and a second upper basket. The support has at least two lateral posts or stanchions which can be engaged directly or indirectly to the baskets on two opposing sides to create a clearance providing direct access to the opening in the lower and upper baskets from the side used to drive the trolley. The position of the lower basket is offset substantially in relation to the upper basket, such that the lower basket extends out further on the side used to drive the trolley.

9 Claims, 4 Drawing Sheets

U.S. PATENT DOCUMENTS

| | | | | |
|---|---|---|---|---|
| D592,374 S | * | 5/2009 | Zenkus et al. | D34/24 |
| D606,722 S | * | 12/2009 | Walter | D34/12 |
| D606,723 S | * | 12/2009 | Walter | D34/21 |
| 7,648,147 B2 | * | 1/2010 | Lauer et al. | 280/47.35 |
| 7,654,541 B2 | * | 2/2010 | Stengel et al. | 280/47.19 |
| 2004/0113381 A1 | * | 6/2004 | Bergia | 280/47.26 |
| 2005/0012286 A1 | * | 1/2005 | Woodrow | 280/47.35 |
| 2009/0174161 A1 | * | 7/2009 | Alves et al. | 280/47.35 |

* cited by examiner

SHOPPING CART HAVING A SUPPORT FOR STACKED BASKETS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a trolley or shopping cart, in particular, for the transport of goods, exhibiting supporting means for superimposing two baskets.

The baskets may be of the type of those known conventionally and made available in self-service stores, being formed of a bottom and of four sides to define an outward opening, and including, generally, moreover, at least one gripping handle.

2. Description of Related Art Including Information Disclosed Under 37 CFR 1.97 and 37 CFR 1.98.

In self-service areas in superstores, it is known to use large-sized trolleys. The later, traditionally made of metal, are particularly suited to large quantities of products. However, they remain relatively cumbersome and are inappropriate for the transport of products in smaller trolleys.

Document EP-1.403.164 divulges a trolley formed of a structure capable of superimposing two baskets. The latter is, in particular, formed of a base mounted on castors and fitted with a recess for receiving a first lower basket. It exhibits, moreover, a rear stanchion, extending upwards from said base, and it is capable of receiving a second upper basket, above the lower basket. The stanchion exhibits, at its upper end, an operating handle of the trolley.

However, when a user controls and directs the trolley, it has direct access to the lower basket by reason of said rear stanchion. Hence, each time he wishes to add an item he must by-pass the latter.

The aim of the present invention is to provide a trolley for supporting two baskets which remedies the shortcomings aforementioned and enables loading of both baskets of the trolley easily.

Another aim of the present invention is to provide a less cumbersome trolley, in particular, during storage.

Another aim of the invention is to provide a trolley at a low production cost.

Another aim of the invention is to provide a trolley for supporting baskets, the baskets as well as their contents being protected against collisions with other trolleys and against collisions with furnishings in a store.

Another aim of the invention is to provide a trolley enabling not only easy access to the baskets but also a trolley enabling lifting and placing the baskets on the latter, on the same side, and without having to by-pass each other.

Other aims and advantages of the invention will appear in the following description, which is given only by way of example and without being limited thereto.

BRIEF SUMMARY OF THE INVENTION

The invention relates to first of all a trolley or shopping cart, in particular, for the transport of goods exhibiting supporting means capable of superimposing two baskets, a first lower basket and a second upper basket, one above the other. The baskets are formed of a bottom and of four sides to define an outward opening. The trolley moreover exhibits gripping means for the operation thereof arranged on one of its sides, a so-called operating side. The trolley is fitted with castors, characterized in that the supporting means consist of at least two lateral stanchions capable of meshing, directly or indirectly, into said baskets, at least at two of their opposite sides, so as to create clearance, providing direct access to the opening of said lower and upper basket from the operating side. The lower basket is situated in a position substantially offset relative to the upper basket, said lower basket moving forward in the direction of said operating side.

BRIEF DESCRIPTION OF THE SEVERAL VIEWS OF THE DRAWINGS

The invention will be understood better when reading the following description, accompanied by the appended drawings.

DETAILED DESCRIPTION OF THE INVENTION

The invention relates to a trolley 1, in particular for the transport of goods, exhibiting supporting means 2, 6, capable of superimposing two baskets, a first lower basket 51 and a second upper basket 52, one above the other.

Figure 1:
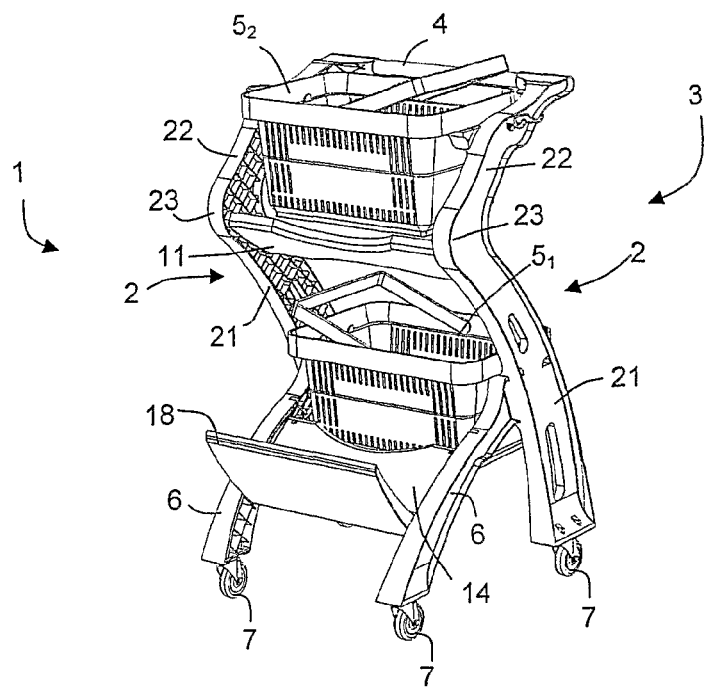
FIG. 1 is a perspective view of a trolley according to the invention according to a first embodiment.

Said baskets consist traditionally of a bottom and of four sides to define an outward opening, and may exhibit, as illustrated on FIG. 1, a handle.

Said trolley exhibits moreover gripping means 4 for the operation thereof arranged on one of its sides 3, a so-called operating side, as well as of the castors 7.

According to the invention, the supporting means 2, 6 consist of at least two lateral stanchions 2, capable of meshing, directly or indirectly, into said baskets 51, 52, at least at two of their opposite sides, so as to create clearance providing direct access to the opening of said lower 51 and upper 52 baskets, from the operating side 3.

Thus, as illustrated in the figures, the structure of the trolley of this invention, and in particular said supporting means, do not limit access, in particular, to the opening of the lower basket 51.

Moreover, the removable lower 51 and upper 52 baskets may be lifted and situated on the trolley 1 from the operating side 3.

The supporting means 2, 6 arrange the lower and upper baskets, substantially horizontally.

According to an embodiment of the invention, the supporting means 2, 6 are capable of locating said lower basket 51 in a position substantially offset relative to said upper basket 52, said lower basket moving forward in the direction of said operating side 3.

Figure 4:
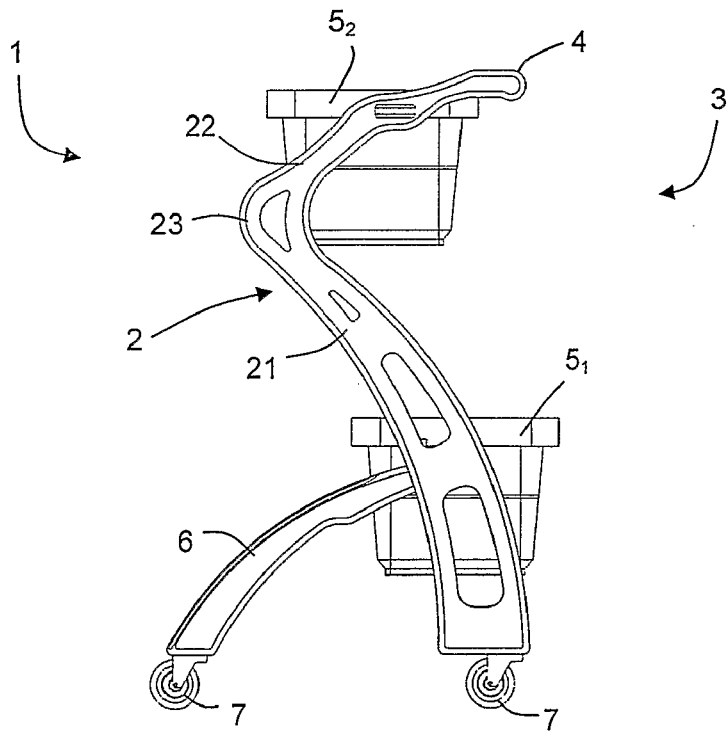
FIG. 4 is a side view of the trolley as illustrated on FIG. 3.
Figure 6:
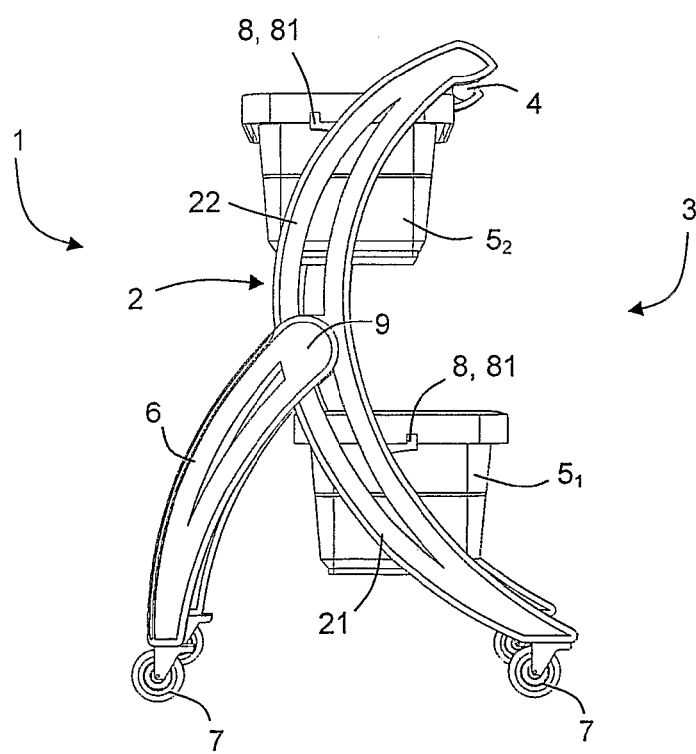
FIG. 6 is a side view of the trolley as illustrated on FIG. 5.
Figure 8:
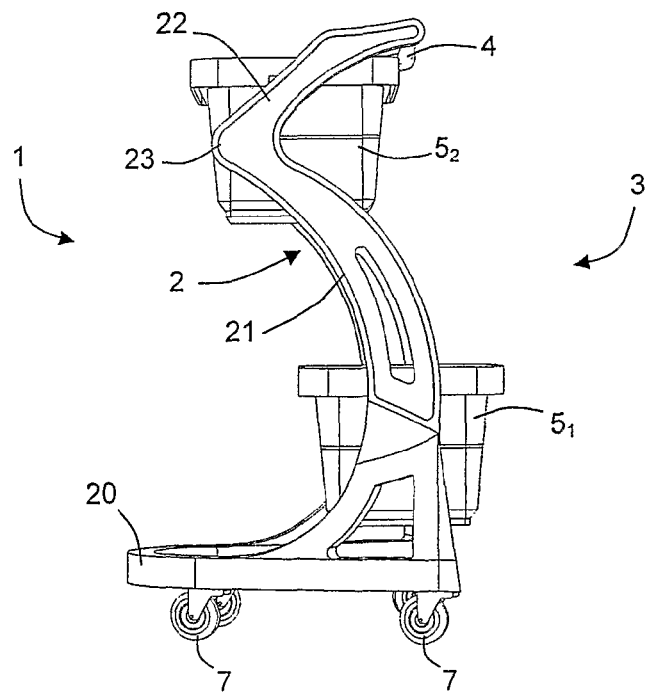
FIG. 8 is a side view of the trolley as illustrated on FIG. 7.

As illustrated on FIGS. 4, 6 and 8, the lower basket is arranged parallel to said upper basket slightly offset by approximately half the width thereof in the direction of the operating side 3. Such arrangement advantageously enables better access to the opening of said lower basket 51, the lower portion of the upper basket 52 not forming an obstacle for the arm of the user when loading the lower basket 51.

Such an arrangement also enables the buyer to have good visibility of the products contained in both baskets, without needing to bend his or her knees.

Advantageously, the baskets are held at two opposite sides forming the smaller sides of the basket.

Moreover, the center of gravity of the baskets is situated vertical to a spot situated between the castors of the trolley. Advantageously, the supporting means are capable of locating the center of gravity of said upper basket 52 vertical to a spot substantially equidistant to the castors of the trolley. Indeed, with the upper basket being arranged at great height, its center of gravity will be situated in the middle of the trolley in order to prevent any undesirable tipping of said trolley.

According to a selected embodiment, the stanchions are arranged parallel and consist of two bent legs 2, in particular being generally C-shaped. Each leg exhibiting a first lower portion 21 tilted towards the side opposite to said operating side 3, and a second upper portion 22 tilted in the direction of the operating side 3.

As illustrated on FIGS. 1 to 4 and 7 to 8, the first lower portion 21 is substantially longer than the second upper part 22, said first portion 21 being in particular in length twice greater than the length of said second part 22. Still on the same Figures, the elbow 23 joining both parts 21, 22 is situated at a height representing approximately half the height of the legs 2.

Said bent legs will advantageously enable locating the lower basket 51 in an offset manner relative to said upper basket 52.

The elbow 23 joining the lower portion 21 and the upper portion 22 enables, in case of front collision of the trolley, protection of the upper basket 52.

The trolley exhibits two feet 6 extending ahead of said legs. Advantageously, the feet extend ahead of said legs 6 from said first lower portion 21.

The feet 6 will also enable protection of the lower basket 5 against collisions.

The lower free end of said feet 6 and/or bent legs 2, is fitted with castors 7.

Figure 5:
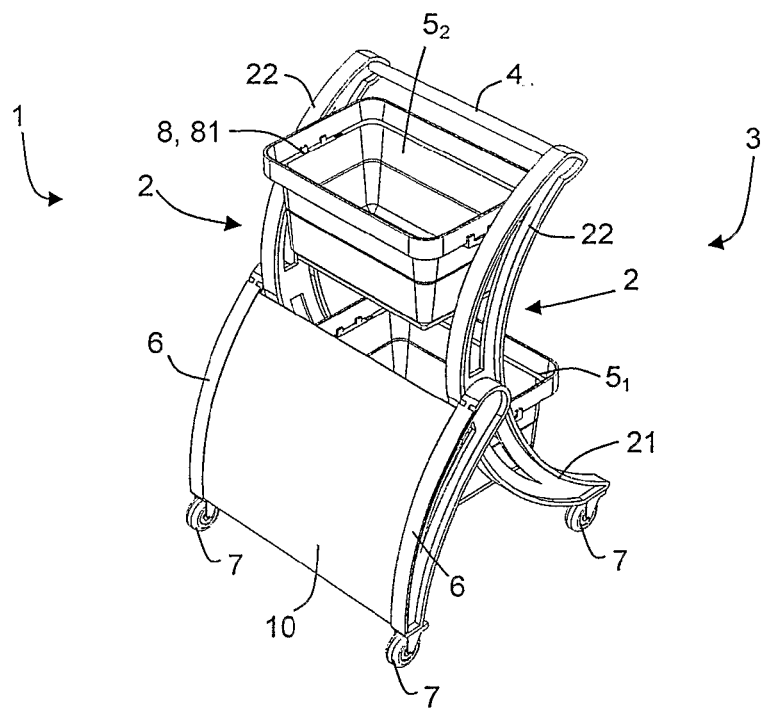
FIG. 5 is a perspective view of a trolley according to the invention according to a third embodiment.

According to an embodiment as illustrated in FIGS. 5 and 6, the feet 6 exhibit means 9 for hinging to said legs and are capable of moving from a spaced apart working position to a closer position for storing trolleys.

Thus, as illustrated on FIG. 6, the feet 6 are hinged by means of a connecting pin 9 to said bent legs 2. Both feet forming the trolley are slaved in rotation by means of a spacer 14 (as shown in dotted lines) situated behind a shaped plate 10.

Advantageously, the feet 6 and said lower portion 21 of said legs exhibit a similar shape and in particular a same curve. Thus, when the feet 6 are curved, the trolley can be stored while occupying minimum space requirements.

Moreover, the trolley exhibits a gripping bar 4 arranged between both free upper ends of said bent legs 2. Advantageously, and as illustrated on Figures, the latter will be arranged close to the upper basket 52 and more particularly close to the upper edge of the basket.

According to a selected embodiment, the structure of the trolley and in particular the side stanchions, are held by means of spacers 4, 11, 14 arranged between said bent legs 2 and/or the feet 6.

The spacers may be assembled to the legs 2 and/or to the feet 3 via fastening means.

The trolley can be suited to different sizes of baskets by using spacers of different lengths.

Thus, to provide a good grip between both side stanchions, the trolley requires at least two spacers. It should be noted that a first spacer can be advantageously formed of said gripping bar 4. The back-up feet 6 may be slaved by means of another spacer 14 situated behind the spacer plate 10, in particular shaped whose purpose is to serve as an advertising medium.

Figure 3:
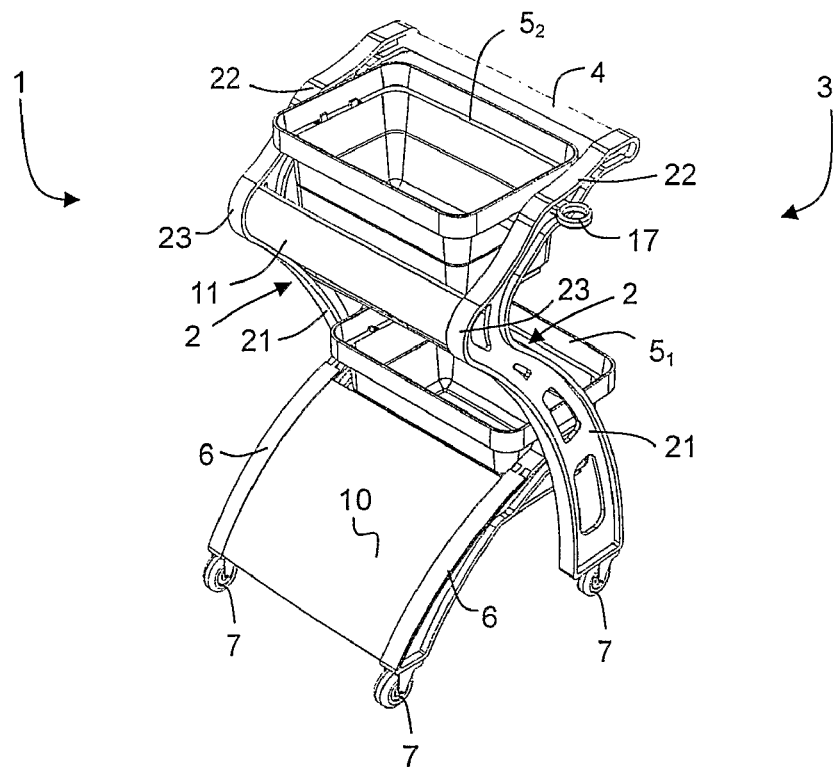
FIG. 3 is a perspective view of a trolley according to the invention according to a second embodiment.

As illustrated on FIG. 3, at least one transparent plastic profile 10, 11, in particular formed by the spacers, enables display of advertisements.

As illustrated on FIG. 1, the trolley may also exhibit an additional spacer, in particular formed of a bar 11, arranged at the elbows 23 in order to stiffen the structure of the trolley, the latter also enabling protection of the upper basket during a front collision.

It should be noted that the trolley requires two or more (2) spacers for joining the stanchions, and in particular the legs 2 and/or the feet 6. Such spacers are placed advantageously at the necessary spots and may adopt different shapes and fulfill an additional function such as, in particular, the protection of the baskets.

Thus, according to a variation illustrated on FIG. 1, the trolley exhibits a spacer 14 and a tray 18 generally rectangular in shape.

The latter is hinged, to pivot at the lower edge thereof, to said feet 6 or to said legs 2 to move from a storage position (not illustrated) to a stable usage position.

In a usage configuration, said tray 18 cooperates with the spacer 14, and forms a V-shaped receptacle capable of accommodating goods, in particular bottles. For instance, the shaped receptacle will enable, in particular, transport of six bottles of water containing one and a half liters stored horizontally.

The tray may also enable carrying a third basket.

In a storage configuration, the tray 18 is pressed against the spacer 14 thus enabling said trolleys to be piled up into one another.

It should be noted also that the baskets 51, 52 partake, when they are fastened to the structure, in particular, to both side stanchions 2, and to the feet 6, in stiffening and strengthening the structure of the trolley 1.

As illustrated in the figures, the side stanchions and in particular the lugs 6 and/or the bent legs 2 are fitted with clamping means 8 capable of meshing into said baskets.

According to an embodiment, as illustrated on FIGS. 5 and 6, for instance, said baskets will exhibit a protrusion on two opposite flanks, fitted with at least one opening capable of meshing into two fingers 81 of the clamping means 8.

According to another embodiment illustrated on FIG. 1, the baskets 51 and 52 may exhibit an upper edge curved downwards, forming a step on the periphery of the basket. The clamping means 8 may then be in the form of fingers 81 capable of protruding at the step of the edge thus formed.

Figure 2:
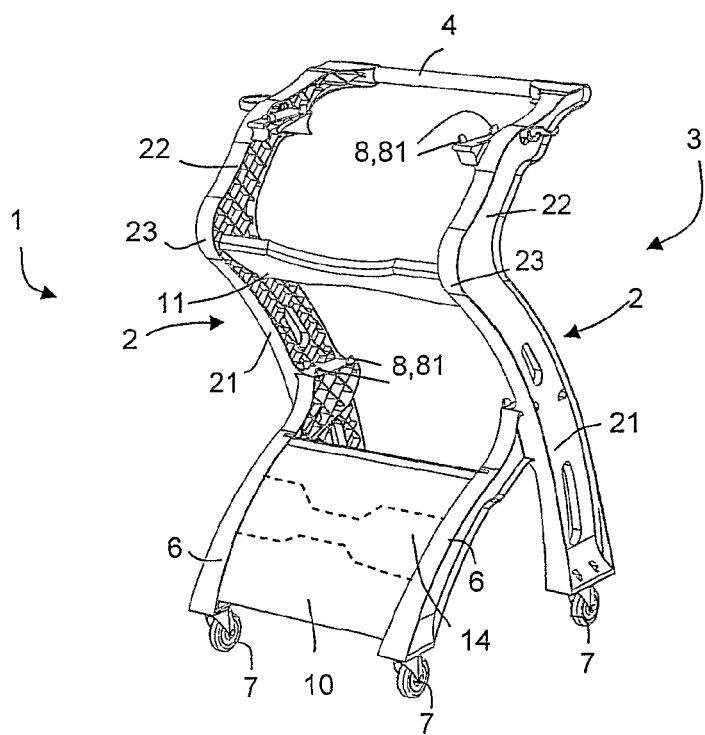
FIG. 2 is a perspective view of a variation of a trolley as illustrated on FIG. 1, without any basket.

Advantageously, as illustrated in the figures, the clamping means may be arranged at the upper end of the feet 6 as illustrated on FIG. 2, the latter being arranged slaved to the bent legs 2 at a side turned toward the inside of the trolley. The clamping means 8 may be arranged at a shim for the upper basket, said shim being slaved to said bent legs 2. The shim and the leg 2 may also form a single piece.

Figure 7:
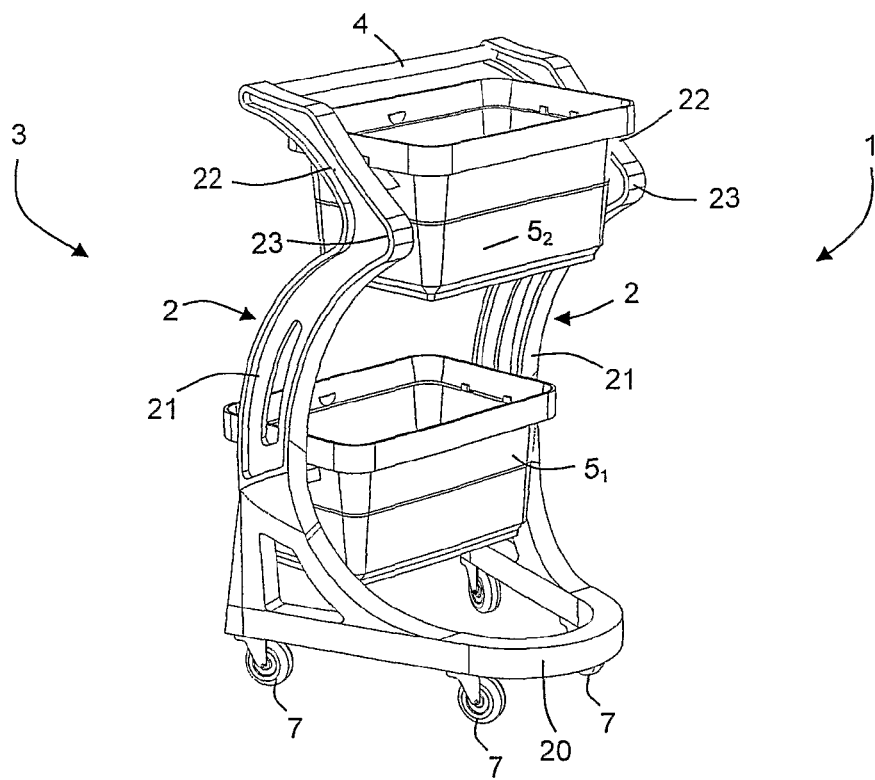
FIG. 7 is a perspective view of a trolley according to the invention according to a fourth embodiment.

According to another embodiment illustrated on FIGS. 7 and 8, the side stanchions and in particular, the lugs 2 form a single piece, the latter being slaved to a common base 20.

The base 20, as illustrated on FIGS. 7 and 8, extends advantageously ahead at the lower basket 51 to protect the latter against front collisions.

Still, the trolleys exhibit interlocking means for being piled up during the storage thereof. Thus the stanchions 2, 6 exhibit tilted sections enabling them to pile up vertically into one another. Thus, the first lower portion 21 and the second upper portion 22 of the legs 2 are tilted advantageously to enable the latter to be piled up.

Similarly, the feet 6, spacers 11, 14, tray 18 and plate 10 are tilted to obtain such results.

According to an embodiment variation as illustrated on FIGS. 1 to 4, the feet 6 are offset relative to said legs 2 in a substantially parallel plane in order to be interlocked between the latter. According to another embodiment variation illustrated on FIGS. 5 and 6, the feet 6 are hinged and brought closer to said bent leg 2 during storage.

As illustrated in FIGS. 7 and 8, the base 20 exhibits a globally V-shaped profile and a rear clearance so as to be piled up into one another.

The different elements forming the trolley and in particular the bent legs 2, the spacers, gripping bars 4 and lugs 6 might be advantageously made of plastic materials, and in particular, by known injection molding methods. As illustrated in FIGS. 1 to 2, the various elements may exhibit a ribbed structure for saving material and offering better stress resistance.

Similarly, the members forming the trolley might be advantageously assembled without any screws or add-on parts, using fastening means between the latter.

Such an arrangement enables delivery of the trolley in kit form, wherein the user may easily assemble the latter. If an element of the trolley is damaged, it can be replaced easily. The cost of delivery and of maintenance are thus reduced.

Moreover, the trolley 1 can be equipped with various fitments, such as a flower bunch support-type ring 17 or a coin-operating locking device.

The trolley can be equipped with two hooks protruding laterally from the stanchions enabling in particular hanging clothes by their hangers or a handbag. A clip can be provided for holding a shopping list.

The invention also relates to a basket formed of a bottom and four sides to define an outward opening, intended for cooperating with a trolley equipped with clamping means capable of meshing with said baskets, being in the form of fingers 81.

According to the invention, the basket exhibits openings intended for engaging into the fingers of the clamping means.

The basket can be made of plastic material. The openings are situated on the higher portion of the basket at a protrusion forming a neck.

As illustrated, the basket may exhibit two openings on each of both opposite sides of the smaller sides of the basket.

Naturally, other embodiments, understandable to the man of the art, could have been contemplated without departing from the framework of the invention.

We claim:

1. A shopping cart for the transport of goods comprising:

a supporting structure having a pair of lateral stanchions and a pair of feet, each of said pair of lateral stanchions being in parallel relationship, each of said pair of lateral stanchions having a lower portion integrally formed with an upper portion, said lower portion extending forwardly and upwardly from a bottom of said supporting structure, said upper portion extending upwardly and rearwardly from an upper end of said lower portion so as to define a curved elbow on one side and a curved indented area on an opposite side thereof, said indented area suitable for receiving the elbow of another supporting structure when shopping carts are stacked together, each of said pair of feet being in parallel relationship, each of said pair of feet extending forwardly and downwardly from said lower portion of the lateral stanchion, each of said pair of feet being offset relative to the lateral stanchion so as to be suitable for interlocking with a lateral stanchion of another supporting structure when a pair of the carts are stacked together;

a tray hingedly connected to said pair of feet, said supporting structure having a spacer member extending between said pair of feet, said tray being pivotable so as to move between a first position forming a receptacle with said spacer member and a second position extending along said pair of feet so as to allow the pair of carts to be stacked together;

a lower basket having a bottom and four flanks extending above said bottom of said lower basket so as to define an opening to an interior volume of said lower basket, said pair of said four flanks meshing respectively with said lower portion of said pair of lateral stanchions;

an upper basket having a bottom and four flanks extending from said bottom of said upper basket so as to define an opening to an interior volume of said upper basket, a pair of said four flanks of said upper basket meshing respectively with said upper portion of said pair of lateral stanchions, said pair of lateral stanchions forming a clearance to said openings of said upper and lower baskets so as to allow direct access to said interior volumes of said upper and lower baskets from a rear of said supporting structure;

a gripping member extending between said pair of lateral stanchions at a rear of said supporting structure, said gripping member positioned adjacent said opening of said upper basket; and a plurality of casters affixed at said bottom of said supporting structure so as to allow said supporting structure to move along an underlying surface, each of said pair of feet respectively having a pair of casters of said plurality of casters at a bottom thereof.

2. The shopping cart of claim 1, said upper basket having a center of gravity vertical to and equidistant to said plurality of casters.

3. The shopping cart of claim 1, said pair of feet being hingedly connected respectively to said pair of lateral stanchions so as to be movable between a working position and a stowed position.

4. The shopping cart of claim 1, said gripping member being a bar extending between the upper portions of said pair of lateral stanchions.

5. The shopping cart of claim 1, said supporting structure having a spacer extending between said pair of lateral stanchions.

6. The shopping cart of claim 5, said spacer having a transparent profile so as to allow a display of advertisements.

7. The shopping cart of claim 1, each of said pair of lateral stanchions having a clamp thereon, said clamp being formed of fingers extending so as to mesh with at least one of said upper and lower baskets.

8. The shopping cart of claim 1, said supporting structure and said gripping member being formed of a polymeric material.

9. The shopping cart of claim 7, said pair of flanks of said plurality of flanks of said at least one of said upper and lower baskets having a openings formed therein, said fingers engaged with said openings.

* * * * *